United States Patent
Pony et al.

(10) Patent No.: US 11,816,676 B2
(45) Date of Patent: Nov. 14, 2023

(54) SYSTEM AND METHOD FOR GENERATING JOURNEY EXCELLENCE SCORE

(71) Applicant: NICE LTD., Ra'anana (IL)

(72) Inventors: Adi Pony, Tel Aviv (IL); Gennadi Lembersky, Nesher (IL); Roy Klein, Rishon Lezion (IL)

(73) Assignee: Nice Ltd., Ra'anana (IL)

( * ) Notice: Subject to any disclaimer, the term of this patent is extended or adjusted under 35 U.S.C. 154(b) by 672 days.

(21) Appl. No.: 16/029,023

(22) Filed: Jul. 6, 2018

(65) Prior Publication Data
US 2020/0013068 A1  Jan. 9, 2020

(51) Int. Cl.
*G06Q 30/01* (2023.01)
*H04M 3/51* (2006.01)
*H04M 3/22* (2006.01)

(52) U.S. Cl.
CPC .......... *G06Q 30/01* (2013.01); *H04M 3/2227* (2013.01); *H04M 3/5175* (2013.01)

(58) Field of Classification Search
CPC .. G06Q 30/01; H04M 3/2227; H04M 3/5175; H04M 2203/401; H04M 3/5166
USPC ...................................................... 705/304
See application file for complete search history.

(56) References Cited

U.S. PATENT DOCUMENTS

| | | | | |
|---|---|---|---|---|
| 6,724,887 B1* | 4/2004 | Eilbacher | ............ | H04M 3/5183 379/265.02 |
| 7,870,491 B1* | 1/2011 | Henderson | .............. | G06F 9/453 715/745 |
| 8,000,989 B1* | 8/2011 | Kiefhaber | .............. | G06Q 40/00 705/7.12 |
| 8,126,723 B1* | 2/2012 | Bansal | ............... | G06Q 30/0282 705/347 |
| 8,265,261 B1* | 9/2012 | Adamson | ............ | H04M 3/5166 379/265.02 |
| 10,264,128 B1* | 4/2019 | Siddiqui | ................ | G06N 5/022 |
| 10,440,180 B1* | 10/2019 | Jayapalan | .............. | G06N 5/041 |
| 2003/0144868 A1* | 7/2003 | MacIntyre | ......... | G06Q 10/0637 705/7.38 |

(Continued)

OTHER PUBLICATIONS

Tele Tech Holdings, Inc., Masterminding the Contract Center of the Future, 2014 (Year: 2014).*

(Continued)

*Primary Examiner* — Sarah M Monfeldt
*Assistant Examiner* — John S. Wasaff
(74) *Attorney, Agent, or Firm* — PEARL COHEN ZEDEK LATZER BARATZ LLP

(57) ABSTRACT

A system and method for calculating a journey excellence score (JES) for a customer journey in a contact center, including, during a training phase: representing each of a plurality of tagged customer journeys by a list of attributes and a value associated with each of the attributes, wherein each of the tagged customer journeys is tagged with respect to a dissatisfaction indicator, and training a model using the plurality of tagged customer journeys, based on the associated values and tags, to generate model weights; and at runtime: obtaining the customer journey; representing the customer journey by the list of attributes and a value associated to each of the attributes; and calculating the JES for the customer journey by applying the model weights to the associated values.

21 Claims, 5 Drawing Sheets

(56) References Cited

U.S. PATENT DOCUMENTS

| | | | | |
|---|---|---|---|---|
| 2005/0015217 | A1* | 1/2005 | Weidl | G05B 23/0281 702/185 |
| 2005/0060217 | A1* | 3/2005 | Douglas | G06Q 10/06 705/7.14 |
| 2008/0270209 | A1* | 10/2008 | Mauseth | G06Q 10/10 705/7.29 |
| 2012/0130771 | A1* | 5/2012 | Kannan | G06Q 10/06393 705/7.32 |
| 2012/0208526 | A1* | 8/2012 | Fisher | H04M 3/42059 455/423 |
| 2013/0080362 | A1* | 3/2013 | Chang | H04L 67/22 706/21 |
| 2013/0094633 | A1* | 4/2013 | Mauro | H04M 7/0039 379/88.01 |
| 2013/0110271 | A1* | 5/2013 | Fornell | G06N 20/20 700/104 |
| 2014/0058831 | A1* | 2/2014 | Duva | H04M 3/5175 705/14.45 |
| 2014/0136443 | A1* | 5/2014 | Kinsey, II | G06Q 10/1095 705/347 |
| 2014/0180974 | A1* | 6/2014 | Kennel | G06Q 40/025 706/12 |
| 2014/0278738 | A1* | 9/2014 | Feit | G06Q 30/0201 705/7.29 |
| 2014/0278754 | A1* | 9/2014 | Cronin | G06F 16/2453 705/7.29 |
| 2015/0073929 | A1* | 3/2015 | Psota | G06Q 30/0241 705/26.2 |
| 2015/0302436 | A1* | 10/2015 | Reynolds | G06Q 30/0201 705/7.32 |
| 2016/0065738 | A1* | 3/2016 | Schwartz | G06Q 30/016 379/265.03 |
| 2016/0104091 | A1* | 4/2016 | Fletcher | H04L 41/5045 705/7.39 |
| 2016/0225038 | A1* | 8/2016 | Niemoeller | H04W 4/24 |
| 2016/0300252 | A1* | 10/2016 | Frank | G06F 16/24578 |
| 2016/0344868 | A1* | 11/2016 | Conway | H04M 3/42221 |
| 2016/0352900 | A1* | 12/2016 | Bell | H04M 3/5175 |
| 2017/0039491 | A1* | 2/2017 | Gauthier | G06Q 10/067 |
| 2017/0094058 | A1* | 3/2017 | Piaggio | G06Q 30/0203 |
| 2017/0116616 | A1* | 4/2017 | Donatelli | G06N 5/022 |
| 2017/0140313 | A1* | 5/2017 | Nandi | G06Q 10/0637 |
| 2017/0140387 | A1* | 5/2017 | Nandi | G06Q 30/016 |
| 2017/0186018 | A1* | 6/2017 | Nandi | G06Q 30/016 |
| 2017/0308903 | A1* | 10/2017 | Agranonik | G06Q 10/06393 |
| 2018/0268347 | A1* | 9/2018 | Benedetti | G06Q 30/02 |
| 2019/0034693 | A1* | 1/2019 | Zang | G06T 7/11 |
| 2019/0034963 | A1* | 1/2019 | George | G06N 5/04 |
| 2019/0311279 | A1* | 10/2019 | Sinha | G06K 9/6257 |

OTHER PUBLICATIONS

Karademir, R., & Heves, E. (Jul. 2013). Dynamic interactive voice response (IVR) platform. In Eurocon 2013 (pp. 98-104). IEEE. (Year: 2013).*

* cited by examiner

SYSTEM AND METHOD FOR GENERATING JOURNEY EXCELLENCE SCORE

FIELD OF THE INVENTION

Embodiments of the invention relate to technology for analyzing customer experiences when interfacing an organization, by for example automatically generating journey excellence scores, possibly using machine learning algorithms.

BACKGROUND OF THE INVENTION

Technology exists to analyze interactions a person (such as a customer) has with agents (e.g., people or computerized processes). In this context a journey may include a series of interactions or communications sessions (e.g. conversations or exchanges) people have with companies. Computerized or computer-aided technology exists which aids in analysis of such journeys.

Customer journey analysis, or customer experience (CX) measurement tools, may provide valuable information that may be used for optimizing customer experience in contact centers. The analysis usually starts by identifying points of client dissatisfaction, e.g., a complaint from a client or journeys associated with churn, and continues with in depth review of the journey, in order to gain understanding of possible connection between the design of the journey and the customer behavior. If the analysis is successful, insights gained from the analysis may lead to better design of the journey and higher customer satisfaction.

Most of the existing CX measurement tools and technology is based on surveys such as customer satisfaction score (CSAT), net promoter score (NPS) and customer effort score (CES). Other metrics are based on granular key performance indicators (KPIs) or other ratings such as churn-rate, average handling time, first response time, etc. These methods provide relatively low accuracy. Surveys have low response rate and are biased by driven customer behavior, e.g., most of the responses are from extremely delighted or frustrated customers. Thus, there is no evaluation of the entire population. KPIs, on the other hand, may be measured on the entire customers population. However, the results of current technologies which use KPIs do not provide an insight into the root-cause for the costumer behavior, KPIs measure customers satisfaction or dissatisfaction, but cannot explain the reasons for both. These deficiencies adversely impact the effectivity of CX measurements.

SUMMARY

According to embodiments of the invention, there is provided a system and method for calculating a journey excellence score (JES) for a customer journey in a contact center. Embodiments of the invention may include: during a training phase: representing each of a plurality of tagged customer journeys by a list of attributes and a value associated with each of the attributes, wherein each of the tagged customer journeys is tagged or labelled with respect to a dissatisfaction indicator; training a model using the plurality of tagged customer journeys, based on the associated values and tags, to generate model weights; at runtime: obtaining the customer journey; representing the customer journey by the list of attributes and a value associated to each of the attributes; and calculating the JES for the customer journey by applying the model weights to the associated values.

According to embodiments of the invention, each of the tagged customer journeys may be tagged as a positive journey or a negative journey with respect to the dissatisfaction indicator, and embodiments of the invention may include obtaining equal or substantially equal number of positive journeys and negative journeys.

According to embodiments of the invention, each of the tagged customer journeys may be tagged as a positive journey or a negative journey with respect to a plurality of dissatisfaction indicators.

Embodiments of the invention may include obtaining equal or substantially equal number of positive journeys with respect to each of the dissatisfaction indicators, and obtaining a number of negative journeys that equals the total number of positive journeys.

If the tagged customer journeys is tagged as a positive journey with respect to a dissatisfaction indicator, then the tag may equal a dissatisfaction power, and the dissatisfaction power may be value relative to a scale that indicates the importance of that dissatisfaction indicator.

The model may be for example a regression model, and the model weights may be attribute weights of the regression model.

Embodiments of the invention may include determining an importance of an attribute to the score of the customer journey according to a multiplication of the attribute value and the associated weight, relatively to multiplication of the other attribute values and the associated weight.

Embodiments of the invention may include using a decay function to adjust a tag of a tagged customer journey according to a time that have passed from the tagged customer journey to an associated dissatisfaction event.

The attributes may be selected from: a number of different channels per journey, an average duration per channel type per journey, a most common contact reason per journey, a number of total sessions per journey and a total duration of the journey.

Embodiments of the invention may include at least one of: routing the customer to an agent according to the score for the customer journey; and dynamically modifying interactive voice response (IVR) menus according to the JES of the customer journey.

According to embodiments of the invention, there is provided a system and method for calculating a rating for a series of customer interactions in a contact center. Embodiments of the invention may include: during a first phase: obtaining a plurality of labelled series of customer interactions, wherein each of the series of customer interactions is labelled for a dissatisfaction indicator, for each of the labelled series of customer interactions creating an associated list of attributes and a grade associated with each of the attributes; creating a computerized model using the plurality of labelled series of customer interactions, based on the associated grades and labels, to generate parameters; during a second phase: receiving the series of customer interactions; representing the series of customer interactions by the list of attributes and a grade associated to each of the attributes; and calculating the rating for the series of customer interactions by applying the parameters to the associated grades.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
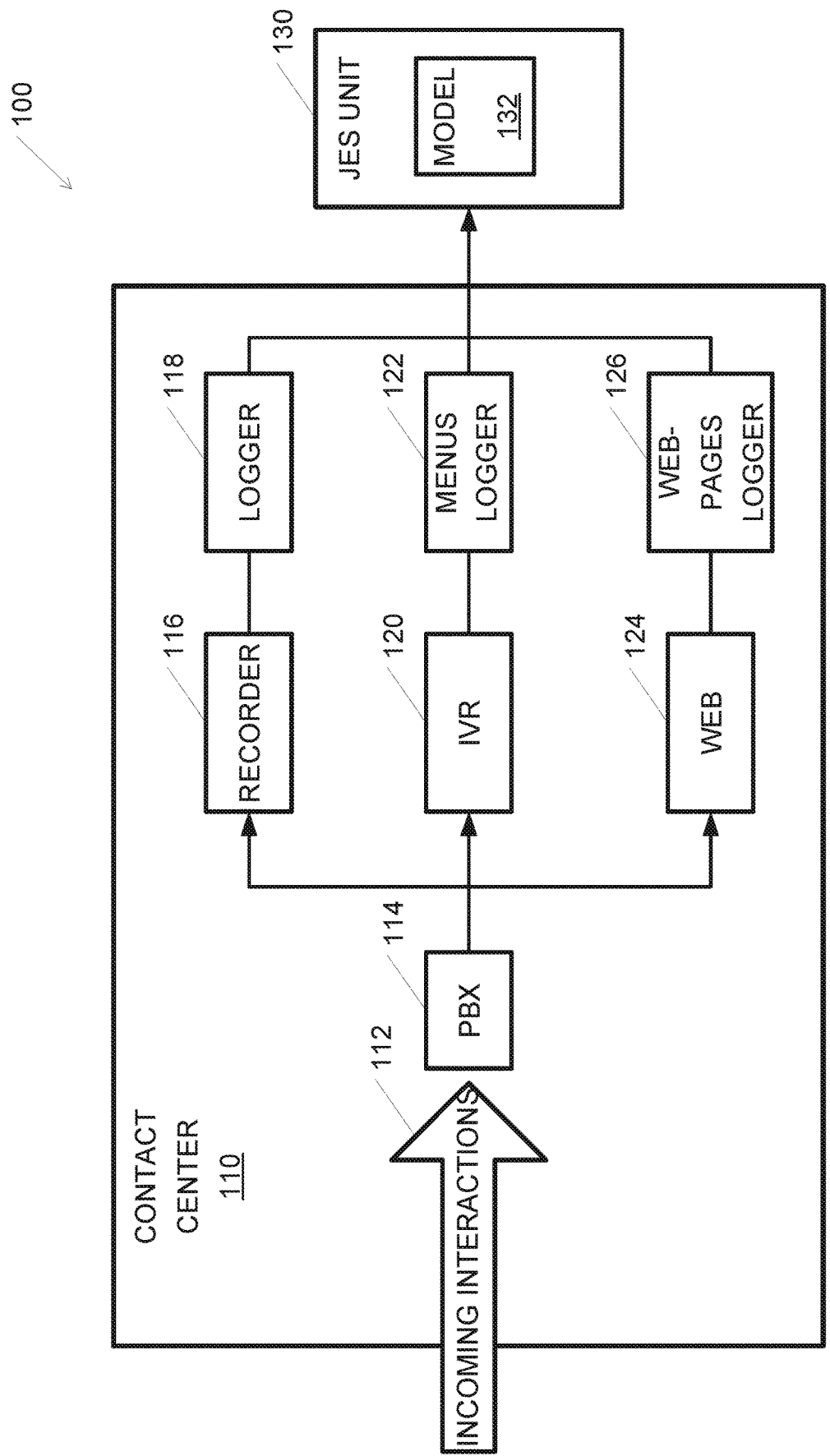
FIG. 1 schematically illustrates a system for calculating journey excellence scores, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention pertain, inter alia, to the technology of contact centers. Embodiments may provide an improvement to contact center technology by for example improving the measurement of customer satisfaction by performing journey analysis. Embodiments of the invention provide unique machine learning (ML) based method to estimate customer satisfaction from logs and recordings of customer journeys.

As used herein a customer journey, also referred to as a journey, may refer to a group of consecutive interactions or sessions such as communication of a single customer, that belong to the same business process. A journey may refer to both the actual process of the customer interacting with the organization, and also the data representing that process; similarly an interaction may refer to the actual event of a person interacting with an organization, or the data representing such an interaction. A journey may include a number of interactions or sessions between a customer and the company carried over a number of channels, e.g., in a contact center. A channel may refer to a way to contact the company, e.g. by phone, web, IVR (interactive voice response), retail (in person at a store), etc. For example, a customer may navigate through an internet site of the organization, hold a chat interaction with an agent through a chat interface in the internet site, call the company and navigate through an IVR system, and talk to an agent. Each of these interactions may happen several times in a single journey. Customer journeys may depend on an industry and the business processes.

Embodiments of the invention may provide a method for estimating customer satisfaction by calculating a rating or metric such as a journey excellence score (JES) or rating. Given a customer journey, the JES may provide an indication whether the customer journey will lead to undesired events such as churn, complaint and others. JES may be a good predictor of (e.g., may have a high correlation with) certain business KPIs, such as churn rate or complaint rate, etc. In a healthy organization, only a small fraction of the customer journeys is associated with customer dissatisfaction categories or indicators, such as churn, complaint, dissatisfaction expressed in a survey or detected following sentiment analysis or opinion mining. The reason for the customer dissatisfaction may be hidden in present or past journeys. Thus, in case of known customer dissatisfaction, all journeys in the lifecycle of the customer prior to the problematic journey should be suspicious of being a cause for dissatisfaction. However, the effect of past journeys may decay with time.

Customer journeys may be represented by a set or a list of attributes and a value, grade or rating associated with each attribute. The list of attributes may be determined by a user. The grades with respect to each attribute may typically be automatically measured or calculated by a system, e.g. a unit in FIG. 1. According to embodiments of the invention, customer journeys that are associated with customer dissatisfaction indicators may be tagged, labelled or marked, e.g., by a user, as "positive" journeys, e.g., positive with respect to one of the dissatisfaction indicators. Past journeys of a customer prior to the problematic journey may be tagged or labelled as "positive" journeys as well. Customer journeys that are not associated with any customer dissatisfaction indicator may be tagged, labelled or marked as "negative" journeys e.g., negative with respect to all of the dissatisfaction indicators. When used in this context, positive and negative do not mean good or bad, rather they mean there is or is not a certain indicator. A dissatisfaction indicator may be a sign indicating that the customer is not satisfied. A dissatisfaction indicator may be generated following an event that suggests that the customer is not satisfied, such as obtaining a complaint from a customer, obtaining a negative feedback in a survey, customers leaving the organization (churn), etc.

According to embodiments of the invention, a machine learning (ML) model may be trained using the tagged, labelled or marked customer journeys. The plurality of tagged customer journeys may be referred to herein as a training set. In some embodiments the training set may be balanced, e.g., the training set may include an equal number of positive journeys and negative journeys. In some embodiments, the positive journeys may be labelled or tagged with respect to one of one or more dissatisfaction indicators. In this case, in a balanced set, the total number of negative journeys may be equal to the total number of positive journeys. A balanced set may provide better results, e.g., a model that provides more accurate predictions. However, in healthy organizations there are typically more negative journeys than positive journeys, and thus, obtaining balanced training sets may be difficult. Therefore, the training set may be only nearly or substantially balanced and may, for example, include more negative journeys than positive journeys, e.g., include up to 60% or even 70% negative journeys, or include up to 60% or even 70% positive journeys. In some embodiments, the ML model is a logistic regression model, and the result of the training phase may include the model parameters or weights. The model may be used in a running or runtime phase to evaluate new or current customer journeys by calculating a JES for each evaluated customer journey. For example, the model weights may be applied to grades of attributes of the new or current customer journeys.

Reference is made to FIG. 1, which schematically illustrates a system 100 for calculating JES, according to embodiments of the invention. System 100 may include contact center 110 and JES unit 130. It is noted that while in FIG. 1 JES unit 130 is shown as separated from contact center 110, in some embodiments JES unit 130 may be included in contact center 110. Contact center 110 may support various types of incoming interactions 112 as may be required, e.g., by an organization. PBX 114 may route incoming interactions 112 to the relevant system, e.g., incoming calls may be routed to interactive voice response (IVR) block 120, Internet sessions may be routed to web block 124 and voice interactions with agents may be routed to recorder 116. For example, contact center 110 may include web block 124 to support web interactions over the Internet, IVR block 120 for providing menus and other information to customers and for obtaining selections and other information from customers, and recorder 116 for recording voice sessions with customers. It may be appreciated that contact center 110 presented in FIG. 1 is not limiting and may include any blocks and infrastructure needed to handle voice, text (SMS, WhatsApp messages, chats, etc.,) video and any type of interaction with costumers. Interaction data may be stored, e.g., in files. Voice interactions (e.g., calls) handled by recorder 116 may be transcribed and stored or logged by recorder 118, IVR interactions performed by IVR block 120 may be stored or logged by menus logger 122, and web interactions handled by web block 124 may be recorded or logged by web-pages logger 126. The data stored by recorder 118, logger 122 and web-pages logger 126 may be transferred to JES unit 130.

A sequence or series of sessions or interactions with a single customer may form a customer journey. For example, if a customer contacts a company within less than a number of days, e.g., one week, from a previous interaction, the current interaction may be considered as related to the previous interaction and both become a part of the same journey. In some embodiments, a journey in data form may be limited to last no more than a predetermined period, e.g., one month. Other methods and algorithms may be used to determine if a sequence or series of sessions or interactions with a single customer constitute a single journey or a plurality of journeys. JES unit 130 may obtain a plurality of customer journeys from contact center 110 and may train an ML model, e.g., model 132, and use the trained model 132 to calculate a JES for each journey, as disclosed herein. The model may be for example embodied in software using a formula, such as equation 1 presented herein, and executed by a computer or processor e.g., processor 505 shown in FIG. 5.

Figure 2:
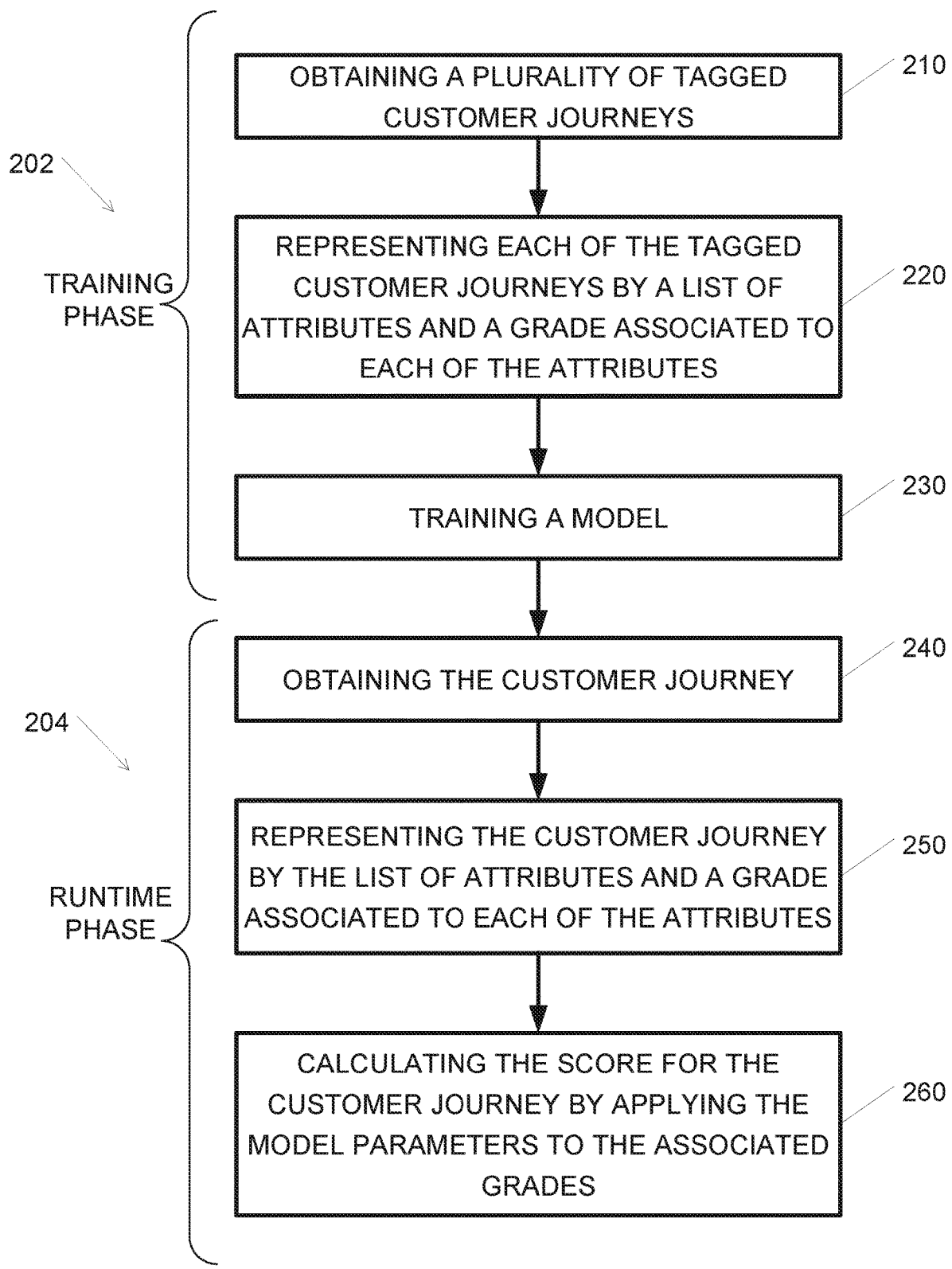
FIG. 2 is a flowchart of a method for calculating journey excellence scores, according to embodiments of the present invention.

Reference is now made to FIG. 2 which is a flowchart of a method for calculating JES, according to embodiments of the present invention. A method for calculating JES may be performed, for example, by JES unit 130 presented in FIG. 1, but other hardware may be used. The method for calculating JES may be divided into for example two periods or phases, training phase 202 and runtime phase 204. During the training phase 202, an ML model, e.g., model 132, may be trained or altered using tagged or labeled customer journeys to generate model weights. During the runtime phase 204, a rating or JES may be calculated for new journeys, e.g., journeys that are not tagged and were not used in the training phase, by applying the model weights to the new journey. It should be readily understood that the training may continue in parallel to the runtime phase. For example, a JES may be calculated for a new journey using previously calculated model weights. However, if later the customer associated with the new journey complains, the new journey may be labeled as "positive" with respect to complaint and may be used as a part of an updated training set to train or alter the model and further refine the model weights. Continuously updating the training sets with new journeys may keep the model weights up to date and relevant.

In operation 210, a plurality of tagged or labeled customer journeys may be received or obtained, e.g., from a contact center such as contact center 110 presented in FIG. 1. The obtained customer journeys may be tagged or labeled e.g., provided with a tag, with respect to a dissatisfaction indicator. For example, the tag or label may be added, e.g., by JES unit 130, to a data object of the journey. A dissatisfaction indicator may be churn, complaint, dissatisfaction expressed in a survey or sentiment. A journey may be tagged or labeled as positive with respect to a dissatisfaction indicator (and thus a "positive journey" may mean the journey resulted in dissatisfaction). For example, if a client complains, a journey associated with this client may be tagged or labeled as positive with respect to complaint. If a journey is not associated with any dissatisfaction indicator, it may be tagged or labeled as negative: thus negative journeys as used herein may be those that are satisfactory, or lack identified problems. Journeys may be tagged or labeled by a user or automatically, e.g., by JES unit 130. For example, journeys may be tagged or labeled in default as negative. However, if a customer complains, or is associated with other dissatisfaction indicator, all journeys associated with this customer may be automatically tagged or labeled as positive with respect to or for the relevant dissatisfaction indicator. Thus, in some embodiments. "negative" when applied to a journey or to a specific indicator or category, may mean that there is not a problem, and the journey, or the journey with respect to or for an indicator, is acceptable or good.

In some embodiments, journeys may be labeled either as negative, e.g., labeled as '0', or positive. e.g., labeled as '1'. Other values may be used to indicate positive (e.g. a journey associated with a dissatisfaction indicator) and negative (e.g. a journey not associated with any dissatisfaction indicator). In some embodiments, each dissatisfaction indicator or category may be given a dissatisfaction power, e.g., a value relative to a scale (e.g., 0-1, or a percentage), that indicates the importance or significance of that dissatisfaction indicator to the system operator. In this case, the tag or label may equal the dissatisfaction power if a journey is positive with respect to or for a dissatisfaction indicator, or '0' otherwise. A journey that is tagged or labeled as positive may be referred to herein as a positive journey, and a journey that is tagged or labeled as negative may be referred to herein as a negative journey. In some embodiments the tag or label may be adjusted using a decay function. The decay function may adjust the tag according to the time that have passed from the journey to the dissatisfaction event. For example, if the journey happened more than one month before the dissatisfaction event (e.g. churn), then the journey may not be tagged as positive with respect to or for the relevant dissatisfaction indicator and the tag may equal '0'. More complex decay functions may be used.

In operation 220 the customer journeys obtained in operation 210 may be represented by or transformed to a list of attributes and a value, grade or rating associated with each of the attributes. The attributes may be quality characteristics related to customer journeys and each value may be a metric suited for quantitively measuring the attribute. The attributes and the values may be specific to an industry and designed or predetermined by the system designer. The values for each attribute may be automatically measured or calculated for each journey by the system, e.g., by JES unit 130. An example for a list of attributes may be: the number of sessions per channel type per journey (this attribute is per channel type, e.g. in a journey there may be have 2 voice interactions, 3 IVR interactions and 1 web interaction), the number of different channel types per journey, the average session duration per channel type per journey, the most common contact reason per journey (a contact reason may refer to customer intent classified by the system, e.g. pay a bill, arrange payments, cancel account), the total number of sessions per journey and the total duration of the journey, e.g., the length, in time, of the journey from the beginning of the first session to the end of the last session. The most common contact reason per journey attribute may be represented by a single attribute, e.g., named "contact reason". The value of the contact reason attribute may be a string or a number representing the most common contact reason. For example, the value may be 0 for "defecated product", 1 for "cancel account", 2 for "general question" etc. If, for example, a journey includes three interactions or sessions and two of them have the contact reason "cancel account", then the most common contact reason of this journey is "cancel account", and the attribute value may equal 1. Another option may be to have a number of "contact reason" attributes equal to the number of different contact reasons in the system. So, if there are ten contact reasons there will be ten attributes, each associated with one of the contact reasons. In this case, the values of the "contact reason" attributes may be binary, e.g., 1 or 0 (true or false). In the above example, all contact reason attributes, except for the "cancel account" attribute, will equal 0, and the "cancel account" attribute will equal 1. In some embodiments the values are not normalized. In some embodiments the values may be normalized to be in a predetermined scale.

In operation 230 a model may be trained or modified using the number or series of tagged or labeled customer journeys, based on the associated values and tags, to generate model weights. Training or altering the model may include estimating, calculating and/or setting the model weights or weights, based on the available data, e.g., the tagged customer journeys. In some embodiments, a model may be trained using a balanced set of tagged journeys, e.g., a set including an equal number of positive and negative journeys. For example, journeys may be tagged or labeled as positive with respect to a plurality of dissatisfaction indicators. In a balanced set, the total number of positive journeys (tagged as positive with respect to one of the dissatisfaction factors) should equal or be substantially similar to the total number of negative journeys. In some embodiments, the set includes an equal number of positive journeys related to each dissatisfaction factor. For example, the set may include 5,000 journeys tagged as positive with respect to a specific complaint, 5,000 journeys tagged as positive with respect to churn, 5,000 journeys tagged as positive with respect to dissatisfaction expressed in a survey, and 15,000 negative journeys. Typically, there are much more negative journeys than positive journeys. Thus, in some embodiments, the training set may include comparable, or substantially similar, amounts of positive and negative journeys, e.g., 60% negative journeys and 40% positive journeys or even 70% negative journeys and 30% positive journeys.

In some embodiments the model may be an ML model. In some embodiments the model may be a regression, or a logistic regression model, and the model weights may be weights of attributes of the regression model. In some embodiments the regression model, giving a probability for a positive journey, may be:

$$p(y=1\mid X) = \frac{1}{1+e^{-\Sigma_i w_i x_i}} \quad \text{(Equation 1)}$$

Where p(y=1|X) is the probability for a positive journey, y=1 indicates a positive journey, X is a vector (e.g., an ordered list of data items) of attributes values, $x_i$, of a journey, and $w_i$ is the weight of the i-th attribute. For example, a vector of weights=[$w_0, w_1, \ldots, w_n$,] may be calculated by using a "fit" function of Spark MLlib® API. The weights, $w_i$, may be later used to evaluate new journeys. Other regression models may be used, and other ML models may be used. e.g., neural-networks.

In operation 240 a new customer journey may be obtained, e.g., a customer journey that was not a part of the training set and needs to be evaluated. In operation 250 the new customer journey may be represented by or transformed to the same list of attributes used for the training set in operation 220, and may be given a value for each attribute. The values may be automatically measured or calculated for each journey by the system, e.g., by JES unit 130 similarly to operation 220. Thus, a vector of attribute values, X, may be generated for the new customer journey. In operation 260 a dissatisfaction score for the customer journey may be calculated by applying the model weights to the associated values. For example, the vector of attribute values, X, may be multiplied by the vector of weights W=[$w_0, w_1, \ldots w_n$,] according to Equation 1. Equation 1 may provide the probability that the customer journey is a positive journey, e.g., the probability that the journey may be indicative of dissatisfaction of the customer. The dissatisfaction score or rating may be transformed into a satisfaction score, or JES or rating using for example:

$$\text{JES}=100-p(y=1\mid X) \quad \text{(Equation 2)}$$

Figure 3:
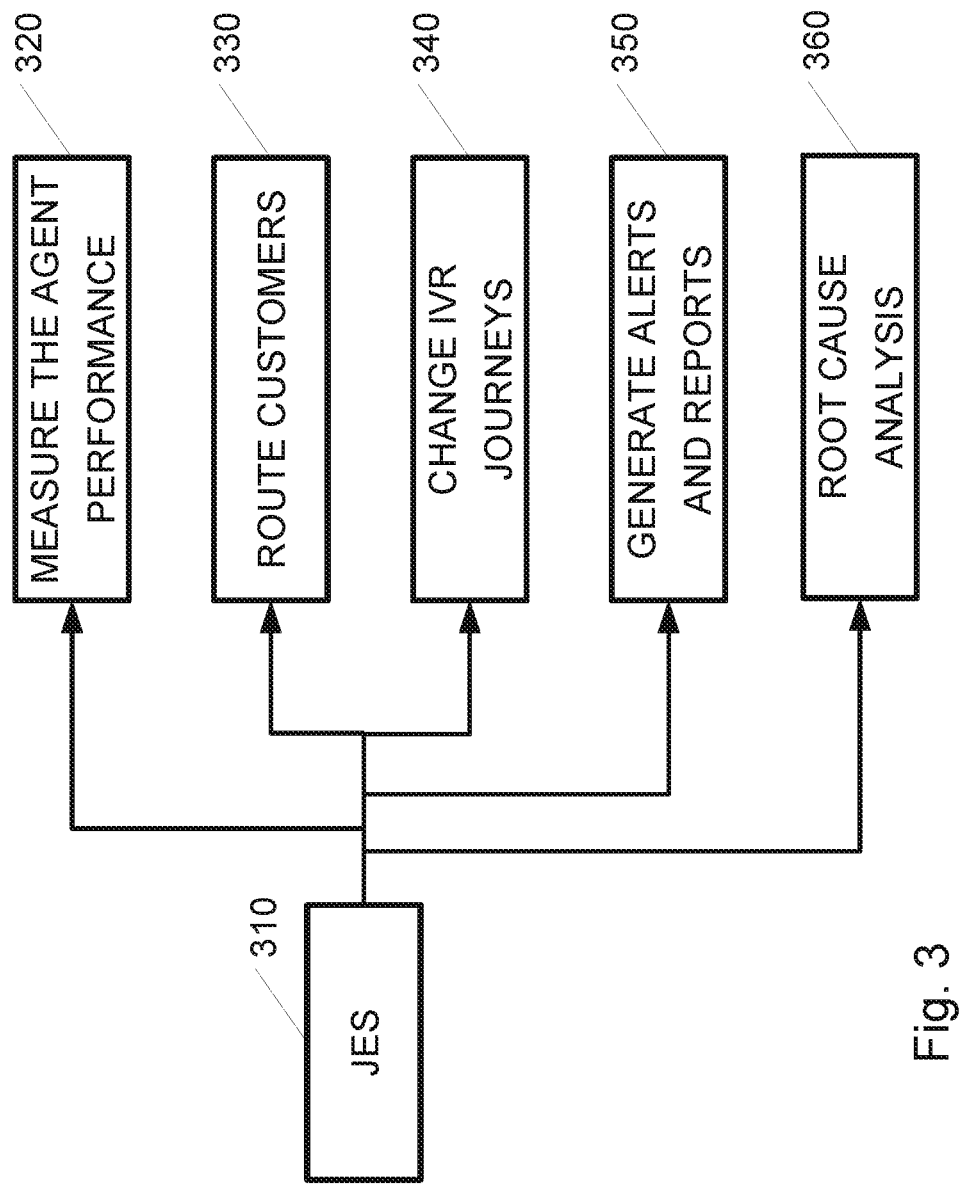
FIG. 3 presents possible usage of journey excellence scores, according to embodiments of the invention.

Reference is no made FIG. 3 presenting possible usage of JES 310, according to embodiments of the invention. As indicated in block 320 JES 310 may be used to measure or evaluate agent performance. For example, JES or rating 310 may be computed for an entire journey, including a session with an agent, and for the same journey without the session with the agent. The difference between the two JES values may be indicative of the agent performance. If JES with the agent session is higher than JES without the agent session than it may imply that the agent functions well. However, if JES with the agent session is lower than JES without the agent session than it may imply that the agent did not perform well. In this case an alert may be sent. e.g., to a supervisor.

Embodiments of the invention may improve the technology of contact centers by dynamically affecting or altering IVR manures and routing of customers. For example, as indicated in block 330, JES may affect routing of customers. For example, customers that have low JES at past journeys may be routed to high-skilled agents when a contact or session with a contact center occurs. According to some embodiments, when a call is received in a contact center (e.g., contact center 110), a JES 310 may be calculated for the current journey. If the JES for the journey is below a threshold, the customer may be routed to an available high-skill agent.

Additionally, as indicated in block 340, IVR menus may be dynamically modified or adjusted based on JES 310. For example, IVR journeys may be shortened for customers that have low JES (e.g., JES below a threshold) at past journeys or in the present journey. IVR journeys may be shortened by routing the customer to an agent more quickly, e.g. suggesting a direct option to talk to an agent or assigning the call to a priority queue.

Various alerts and reports may be generated based on JES 350. Alerts may be generated if JES 310 of a specific customer is below a threshold or has decreased in comparison to past JES values, if the average JES 310 is below a threshold, etc.

Embodiments of the invention may enable performing a root-cause analysis, as indicated in block 360. A root cause analysis may be performed to investigate the cause for a certain level of JES 310, or to find a relative contribution of each attribute to the total JES. For example, the product $w_i^* x_i$ may be computed for each attribute, where $x_i$ is the value of i-th attribute and $w_i$ is the weight of the i-th attribute. The product may be related to or indicative of the relative contribution, for example, the attributes associated with higher product may be considered to have higher relative contribution to the JES than attributes associated with lower product.

Figure 4:
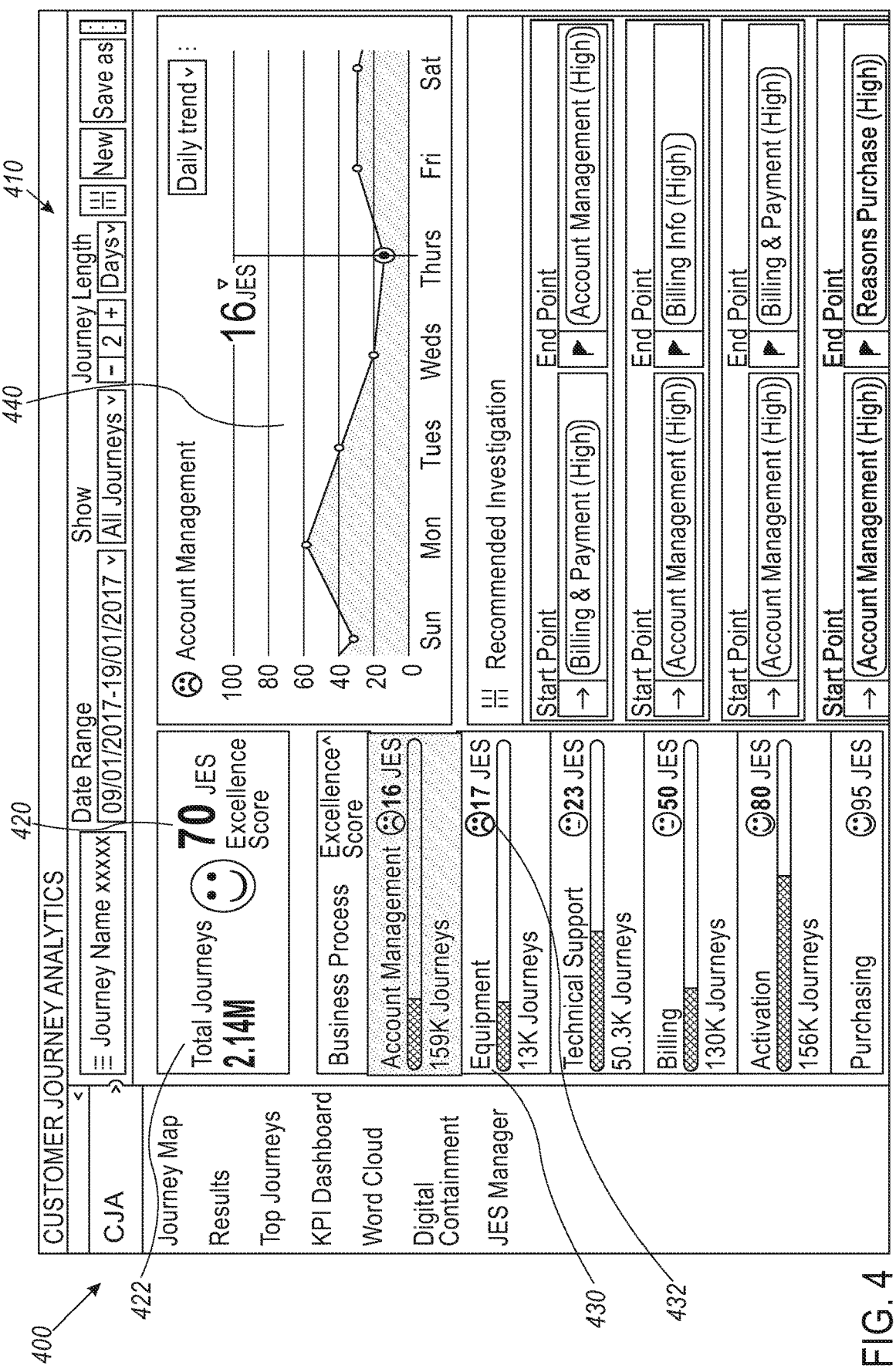
FIG. 4 depicts an exemplary user interface of a system for calculating journey excellence scores, according to embodiments of the invention.

Reference is now made to FIG. 4 depicting an exemplary user interface 400 of system 100, according to embodiments of the invention. User interface 400 may enable filtering 410 to find journey according to one or more filtering criteria, such as a time in which the journey has occurred, customer characteristics (e.g., age, geographical location etc.), and journey length. User interface 400 may display an overall average JES 420, e.g., the average JES score or rating for all the journeys and the overall number of journeys 422 that where returned by the filtering. Journeys may be classified according to the contact reason, also referred to herein as business process 430, e.g., account management, equipment, technical support, billing, activation, purchasing, etc. User interface 400 may display an average JES 432 for each contact reason 430, thus enabling the organization to evaluate the efficiency, or customer satisfaction of each business process 430. User interface 400 may display JES graphs 440, for example, JES of a specific business process 430 over time.

Figure 5:
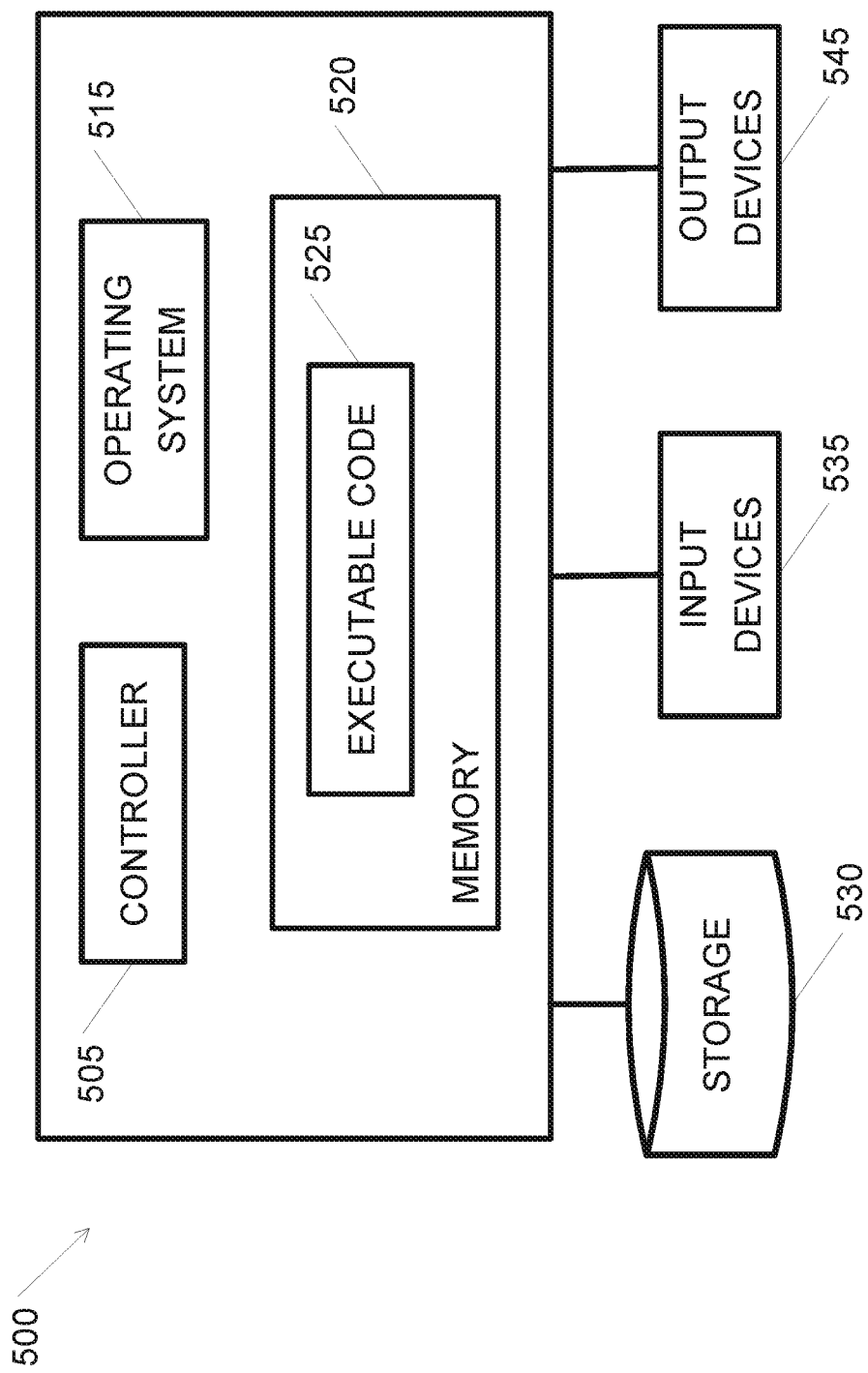
FIG. 5 is a high-level block diagram of an exemplary computing device, according to some embodiments of the present invention.

Reference is made to FIG. 5, showing a high-level block diagram of an exemplary computing device according to some embodiments of the present invention. Computing device 500 may include a processor or controller 505 that may be, for example, a central processing unit processor (CPU), a graphics processing unit (GPU), a chip or any suitable computing or computational device, an operating system 515, a memory 520, executable code 525, storage or storage device 530, input devices 535 and output devices 545. Controller 505 may be configured to carry out methods described herein, and/or to execute or act as the various modules, units, etc., for example by executing code or software. More than one computing device 500 may be included. Multiple processes discussed herein may be executed on the same controller. For example, JES unit 130 presented in FIG. 1 may be implemented by one or more controllers 505.

Operating system 515 may be or may include any code segment (e.g., one similar to executable code 525 described herein) designed and/or configured to perform tasks involving coordination, scheduling, arbitration, supervising, controlling or otherwise managing operation of computing device 500, for example, scheduling execution of software programs or enabling software programs or other modules or units to communicate. Operating system 515 may be a commercial operating system.

Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 may be or may include a plurality of, possibly different memory units. Memory 520 may be a computer or processor non-transitory readable medium, or a computer non-transitory storage medium, e.g., a RAM.

Executable code 525 may be any executable code, e.g., an application, a program, a process, task or script. Executable code 525 may be executed by controller 505 possibly under control of operating system 515. For example, executable code 525 may be an application that when executed calculates JES as further described herein. Although, for the sake of clarity, a single item of executable code 525 is shown in FIG. 5, a system according to embodiments of the invention may include a plurality of executable code segments similar to executable code 525 that may be loaded into memory 520 and cause controller 505 to carry out methods described herein. For example, units or modules described herein may be, or may include, controller 505 and executable code 525.

Storage device 530 may be any applicable storage system, e.g., a disk or a virtual disk used by a VM. Storage 530 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content or data may be stored in storage 530 and may be loaded from storage 530 into memory 520 where it may be processed by controller 505. In some embodiments, some of the components shown in FIG. 5 may be omitted. For example, memory 520 may be a non-volatile memory having the storage capacity of storage 530. Accordingly, although shown as a separate component, storage 530 may be embedded or included in memory 520.

Input devices 535 may be or may include a mouse, a keyboard, a touch screen or pad or any suitable input device. It will be recognized that any suitable number of input devices may be operatively connected to computing device 500 as shown by block 535. Output devices 545 may include one or more displays or monitors, speakers and/or any other suitable output devices. It will be recognized that any suitable number of output devices may be operatively connected to computing device 500 as shown by block 545. Any applicable input/output (I/O) devices may be connected to computing device 500 as shown by input devices 535 and output devices 545. For example, a wired or wireless network interface card (NIC), a printer, a universal serial bus (USB) device or external hard drive may be included in input devices 535 and/or output devices 545.

Some embodiments of the invention may include an article such as a computer or processor non-transitory readable medium, or a computer or processor non-transitory storage medium, such as for example a memory, a disk drive, or a USB flash memory, encoding, including or storing instructions. e.g., computer-executable instructions, which, when executed by a processor or controller, carry out methods disclosed herein. For example, an article may include a storage medium such as memory 520, computer-executable instructions such as executable code 525 and a controller such as controller 505.

The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 520 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 505), a plurality of input units, a plurality of output units, a plurality of memory units, and a plurality of storage units. A system according to some embodiments of the invention may additionally include other suitable hardware components and/or software components. In some embodiments, a system may include or may be, for example, a personal computer, a desktop computer, a laptop computer, a workstation, a server computer, a network device, or any other suitable computing device. For example, a system according to some embodiments of the invention as described herein may include one or more devices such as computing device 500.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus, certain embodiments may be combinations of features of multiple embodiments.

What is claimed is:

1. A method for calculating a journey excellence score (JES) for a customer journey in a contact center, the method comprising:
   during a training phase:
     representing each of a plurality of tagged customer journeys by a list of attributes and a value associated with each of the attributes, wherein each of the tagged customer journeys is tagged with respect to at least one dissatisfaction indicator of a set of dissatisfaction indicators; and
     training a model using the plurality of tagged customer journeys, based on the associated values and tags, to generate model weights; and
   at runtime:
     obtaining the customer journey;
     representing the customer journey by the list of attributes and a value associated to each of the attributes;
     calculating the JES for the customer journey by applying the model weights to the associated values; and
     dynamically modifying interactive voice response (IVR) menus according to the JES of the customer journey.

2. The method of claim 1, wherein each of the tagged customer journeys is tagged as one of being associated with or unassociated with any dissatisfaction indicator of said set of dissatisfaction indicators, and wherein the method comprises obtaining an equal or comparable number of journeys being associated with any dissatisfaction indicator and journeys being unassociated with any dissatisfaction indicator.

3. The method of claim 1, wherein each of the tagged customer journeys is tagged as being associated with or unassociated with any dissatisfaction indicator of said set of dissatisfaction indicators, with respect to a plurality of dissatisfaction indicators.

4. The method of claim 3, the method comprising obtaining an equal or comparable number of journeys being associated with any dissatisfaction indicator with respect to said plurality of dissatisfaction indicators, and obtaining a number of journeys unassociated with any dissatisfaction indicator of said plurality of dissatisfaction indicators that equals the total number of journeys being associated with any dissatisfaction indicator.

5. The method of claim 3, wherein if the tagged customer journey is tagged as being associated with said at least one dissatisfaction indicator of said set of dissatisfaction indicators, then the tag equals a dissatisfaction power, wherein the dissatisfaction power is a value relative to a scale that indicates the importance of said at least one dissatisfaction indicator.

6. The method of claim 1, wherein the model is a regression model, and wherein the model weights are attribute weights of the regression model.

7. The method of claim 6, comprising determining an importance of an attribute to the score of the customer journey according to a multiplication of the attribute value and the associated weight, relative to multiplication of the other attribute values and the associated weight.

8. The method of claim 1, comprising:
   using a decay function to adjust a tag of a tagged customer journey according to a time that has passed from the tagged customer journey to an associated dissatisfaction event.

9. The method of claim 1, wherein the attributes are selected from: a number of different channels per journey, an average duration per channel type per journey, a most common contact reason per journey, a number of total sessions per journey and a total duration of the journey.

10. A method for calculating a rating for a series of customer interactions in a contact center, the method comprising:
    during a first phase:

obtaining a plurality of labelled series of customer interactions, wherein each of the series of customer interactions is labelled for a dissatisfaction indicator;

for each of the labelled series of customer interactions creating an associated list of attributes and a grade associated with each of the attributes; and creating a computerized model using the plurality of labelled series of customer interactions, based on the associated grades and labels, to generate parameters; and during a second phase:

receiving the series of customer interactions;

representing the series of customer interactions by the list of attributes and a grade associated to each of the attributes;

calculating the rating for the series of customer interactions by applying the parameters to the associated grades; and dynamically modifying interactive voice response (IVR) menus according to the rating for the series of customer interactions.

11. A system for calculating a journey excellence score (JES) for a customer journey in a contact center, the system comprising:

a memory; and a processor configured to:

during a training phase:

represent each of a plurality of tagged customer journeys by a list of attributes and a value associated with each of the attributes, wherein each of the tagged customer journeys is tagged with respect to at least one dissatisfaction indicator of a set of dissatisfaction indicators; and train a model using the plurality of tagged customer journeys, based on the associated values and tags, to generate model weights; and at runtime:

obtain the customer journey;

represent the customer journey by the list of attributes and a value associated to each of the attributes;

calculate the JES for the customer journey by applying the model weights to the associated values; and dynamically modify interactive voice response (IVR) menus according to the JES of the customer journey.

12. The system of claim 11, wherein each of the tagged customer journeys is tagged as being associated with or unassociated with any dissatisfaction indicator of said set of dissatisfaction indicators, with respect to a plurality of dissatisfaction indicators.

13. The system of claim 12, wherein the processor is configured to obtain an equal or comparable number of journeys being associated with a dissatisfaction indicator with respect to said plurality of dissatisfaction indicators, and obtaining a number of journeys unassociated with any dissatisfaction indicator of said plurality of dissatisfaction indicators.

14. The system of claim 12, wherein if the tagged customer journey is tagged as being associated with said at least one dissatisfaction indicator of said set of dissatisfaction indicators, then the tag equals a dissatisfaction power, wherein the dissatisfaction power is a value relative to a scale that indicates the importance of said at least one dissatisfaction indicator.

15. The system of claim 11, wherein the model is a regression model, and wherein the model weights are attribute weights of the regression model.

16. The system of claim 15, wherein the processor is configured to determine an importance of an attribute to the score of the customer journey according to a multiplication of the attribute value and the associated weight, relative to multiplication of the other attribute values and the associated weight.

17. The system of claim 11, wherein the processor is configured to use a decay function to adjust a tag of a tagged customer journey according to a time that has passed from the tagged customer journey to an associated dissatisfaction event.

18. The system of claim 11, wherein the attributes are selected from: a number of different channels per journey, an average duration per channel type per journey, a most common contact reason per journey, a number of total sessions per journey and a total duration of the journey.

19. The method of claim 1, further comprising, at runtime, routing the customer to an agent according to the score for the customer journey.

20. The method of claim 10, further comprising, during the second phase, routing the customer to an agent according to the score for the customer journey.

21. The system according to-claim 11, wherein the processor is further configured to, at runtime, route the customer to an agent according to the score for the customer journey.

* * * * *